United States Patent
Furuko et al.

(10) Patent No.: US 10,174,230 B2
(45) Date of Patent: Jan. 8, 2019

(54) BLOCK COPOLYMER COMPOSITION, ADHESIVE COMPOSITION, AND ADHESIVE SHEET

(71) Applicant: ZEON CORPORATION, Chiyoda-ku, Tokyo (JP)

(72) Inventors: Ayako Furuko, Tokyo (JP); Sadaharu Hashimoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/514,209

(22) PCT Filed: Sep. 24, 2015

(86) PCT No.: PCT/JP2015/076988
§ 371 (c)(1),
(2) Date: Mar. 24, 2017

(87) PCT Pub. No.: WO2016/052310
PCT Pub. Date: Apr. 7, 2016

(65) Prior Publication Data
US 2017/0298258 A1    Oct. 19, 2017

(30) Foreign Application Priority Data
Sep. 30, 2014 (JP) .................. 2014-201937

(51) Int. Cl.
| | | |
|---|---|---|
| *C09J 153/02* | (2006.01) | |
| *C09J 7/00* | (2018.01) | |
| *C08L 53/02* | (2006.01) | |
| *C08L 57/02* | (2006.01) | |
| *C09J 7/38* | (2018.01) | |

(52) U.S. Cl.
CPC ............ *C09J 153/02* (2013.01); *C08L 53/02* (2013.01); *C08L 57/02* (2013.01); *C09J 7/00* (2013.01); *C09J 7/387* (2018.01); *C08L 2205/025* (2013.01); *C09J 2201/606* (2013.01); *C09J 2203/334* (2013.01); *C09J 2453/00* (2013.01)

(58) Field of Classification Search
CPC .... C08L 2205/025; C08L 53/02; C08L 57/02; C09J 153/02; C09J 2201/606; C09J 2203/334; C09J 2453/00
See application file for complete search history.

(56) References Cited

U.S. PATENT DOCUMENTS

| | | | |
|---|---|---|---|
| 5,290,842 A | 3/1994 | Sasaki et al. | |
| 2003/0118923 A1* | 6/2003 | Uzee | C08F 283/008 430/18 |
| 2011/0319549 A1* | 12/2011 | Oda | C09J 153/02 524/505 |

FOREIGN PATENT DOCUMENTS

| | | |
|---|---|---|
| EP | 1424359 A1 | 6/2004 |
| JP | S63178187 A | 7/1988 |
| JP | S63178188 A | 7/1988 |
| JP | 2006274157 A | 10/2006 |
| JP | 2006274158 A | 10/2006 |
| WO | 9730844 A1 | 8/1997 |
| WO | 2003020825 A1 | 3/2003 |

OTHER PUBLICATIONS

Dec. 8, 2015, International Search Report issued in the International Patent Application No. PCT/JP2015/076988.
Marjorie J. Hackathorn et al., "The Determination of "Head-Head" and "Tail-Tail" Structures in Poly(Isoprene) S", Rubber Chemistry and Technology, Sep. 1972, vol. 45, No. 5, pp. 1295.

* cited by examiner

*Primary Examiner* — Mark S Kaucher
(74) *Attorney, Agent, or Firm* — Kenja IP Law PC

(57) ABSTRACT

The present invention is a block copolymer composition comprising an aromatic vinyl-isoprene-aromatic vinyl triblock copolymer (A) and an aromatic vinyl-isoprene diblock copolymer (B),
(i) a ratio ($Mw_{Da}/Mw_{Db}$) of a weight average molecular weight $Mw_{Da}$ of a polyisoprene block in the triblock copolymer (A) to a weight average molecular weight $Mw_{Db}$ of a polyisoprene block in the diblock copolymer (B) being 0.5 or more to less than 1,
(ii) a ratio of an aromatic vinyl monomer unit in all polymer components of the block copolymer composition being 10 to 30 mass %, and
(iii) the block copolymer composition having a breaking strength of less than 8 MPa and an elongation at break of less than 1,100%; a pressure-sensitive adhesive composition comprising the block copolymer composition and a tackifying resin; and a pressure-sensitive adhesive sheet comprising a pressure-sensitive adhesive layer that comprises the pressure-sensitive adhesive composition.

6 Claims, No Drawings

BLOCK COPOLYMER COMPOSITION, ADHESIVE COMPOSITION, AND ADHESIVE SHEET

TECHNICAL FIELD

The present invention relates to a pressure-sensitive adhesive composition that exhibits excellent initial adhesion at a low temperature and excellent holding power at a high temperature, and exhibits excellent pressure-sensitive adhesive performance (adhesion) and an excellent die-cutting capability when used for a pressure-sensitive adhesive label, a block copolymer composition that is used to produce the pressure-sensitive adhesive composition, and a pressure-sensitive adhesive sheet that includes a pressure-sensitive adhesive layer that includes the pressure-sensitive adhesive composition.

BACKGROUND ART

In recent years, a pressure-sensitive adhesive composition that does not utilize a solvent and can be hot-melt has been recommended from the viewpoint of environmental issues, energy saving, resource saving, and the like. A styrene-isoprene-styrene block copolymer is widely used as an elastomer that is used for such a pressure-sensitive adhesive composition.

A pressure-sensitive adhesive composition is required to exhibit pressure-sensitive adhesive performance such as the initial adhesion, peel adhesion strength, and holding power. In particular, a pressure-sensitive adhesive composition that exhibits excellent initial adhesion at a low temperature and excellent holding power at a high temperature, has been desired. Various studies have been conducted in order to improve the pressure-sensitive adhesive performance.

For example, Patent Literature 1 and 2 disclose a pressure-sensitive adhesive composition that includes a styrene-isoprene-styrene block copolymer and a styrene-isoprene diblock copolymer.

The pressure-sensitive adhesive compositions disclosed in Patent Literature 1 and 2 exhibit relatively excellent peel adhesion strength at room temperature, but exhibit insufficient initial adhesion at a low temperature or insufficient holding power at a high temperature.

A pressure-sensitive adhesive label is produced by bonding a pressure-sensitive adhesive sheet to a release sheet, and cutting the pressure-sensitive adhesive sheet using a die so as to have the desired shape. When a pressure-sensitive adhesive composition that exhibits an inferior die-cutting capability is used, the pressure-sensitive adhesive sheet may be cut insufficiently, and the pressure-sensitive adhesive labels may adhere to each other, whereby the commercial value may significantly decrease, or the pressure-sensitive adhesive composition may adhere to the die, and the subsequent cutting process may be adversely affected.

Various studies have been conducted in order to improve the die-cutting capability of a pressure-sensitive adhesive composition.

For example, Patent Literature 3 discloses a pressure-sensitive adhesive composition that includes a styrene-isoprene-styrene block copolymer and a styrene-butadiene-styrene block copolymer. Patent Literature 4 discloses a pressure-sensitive adhesive composition that includes a styrene-isoprene-styrene block copolymer, a styrene-isoprene diblock copolymer, and a tackifying resin, and discloses that the composition has a single glass transition temperature.

However, the pressure-sensitive adhesive compositions disclosed in Patent Literature 3 and 4 exhibit an insufficiently improved die-cutting capability, or exhibit an improved die-cutting capability, but exhibit decreased pressure-sensitive adhesive performance (i.e., do not exhibit both excellent pressure-sensitive adhesive performance and an excellent die-cutting capability).

In order to solve the above problem, Patent Literature 5 discloses an elastomer composition that includes an aromatic vinyl-isoprene block copolymer that includes two or more polyaromatic vinyl blocks, an aromatic vinyl-isoprene diblock copolymer, and polyisoprene having a specific weight average molecular weight in a specific ratio.

CITATION LIST

Patent Literature

Patent Literature 1: JP-A-63-178187
Patent Literature 2: JP-A-63-178188
Patent Literature 3: U.S. Pat. No. 5,290,842
Patent Literature 4: WO97/030844
Patent Literature 5: WO2003/020825

SUMMARY OF INVENTION

Technical Problem

Patent Literature 5 states that the elastomer composition disclosed in Patent Literature 5 can produce a pressure-sensitive adhesive composition that exhibits excellent initial adhesion at a low temperature, excellent peel adhesion strength at room temperature, and excellent holding power at a high temperature, and exhibits excellent pressure-sensitive adhesive performance and an excellent die-cutting capability when used for a pressure-sensitive adhesive label.

However, the elastomer composition disclosed in Patent Literature 5 may not meet the desired pressure-sensitive adhesive performance and die-cutting capability, and a pressure-sensitive adhesive composition that exhibits improved pressure-sensitive adhesive performance and die-cutting capability has been desired.

The invention was conceived in view of the above situation. An object of the invention is to provide a pressure-sensitive adhesive composition that exhibits excellent initial adhesion at a low temperature (15 to 25° C. (hereinafter the same)) and excellent holding power at a high temperature (40 to 60° C. (hereinafter the same)), and exhibits excellent pressure-sensitive adhesive performance and an excellent die-cutting capability when used for a pressure-sensitive adhesive label, a block copolymer composition that is used to produce the pressure-sensitive adhesive composition, and a pressure-sensitive adhesive sheet that includes a pressure-sensitive adhesive layer that includes the pressure-sensitive adhesive composition.

Solution to Problem

The inventors conducted extensive studies in order to solve the above problem. As a result, the inventors found that a block copolymer composition including an aromatic vinyl-isoprene-aromatic vinyl triblock copolymer and an aromatic vinyl-isoprene diblock copolymer, the weight average molecular weight of the polyisoprene block in the aromatic vinyl-isoprene-aromatic vinyl triblock copolymer being lower than the weight average molecular weight of the polyisoprene block in the aromatic vinyl-isoprene diblock copolymer, a ratio of an aromatic vinyl monomer unit in all polymer components of the block copolymer composition being within a specific range, and the block copolymer composition having a breaking strength and an elongation at break within specific ranges, can produce a pressure-sensitive adhesive composition that exhibits excellent pressure-sensitive adhesive performance and an improved die-cutting capability. This finding has led to the completion of the invention.

Several aspects of the invention provide the following block copolymer composition (see (1) to (4)), pressure-sensitive adhesive composition (see (5) and (6)), and pressure-sensitive adhesive sheet (see (7)).

(1) A block copolymer composition including an aromatic vinyl-isoprene-aromatic vinyl triblock copolymer (A) and an aromatic vinyl-isoprene diblock copolymer (B), a ratio ($Mw_{Da}/Mw_{Db}$) of a weight average molecular weight $Mw_{Da}$ of a polyisoprene block in the triblock copolymer (A) to a weight average molecular weight $Mw_{Db}$ of a polyisoprene block in the diblock copolymer (B) being 0.5 or more to less than 1,
(ii) a ratio of an aromatic vinyl monomer unit in all polymer components of the block copolymer composition being 10 to 30 mass %, and
(iii) the block copolymer composition having a breaking strength of less than 8 MPa and an elongation at break of less than 1,100%.

(2) The block copolymer composition according to (1), wherein the triblock copolymer (A) has a weight average molecular weight of 100,000 to 250,000, and the diblock copolymer (B) has a weight average molecular weight of 100,000 to 300,000.

(3) The block copolymer composition according to (1) or (2), wherein the ratio ($Ar^a/Ar^b$) of the aromatic vinyl monomer unit content $Ar^a$ in the triblock copolymer (A) to the aromatic vinyl monomer unit content $Ar^b$ in the diblock copolymer (B) is 1.5 or more.

(4) The block copolymer composition according to any one of (1) to (3), including the triblock copolymer (A) and the diblock copolymer (B) in a ratio of 20 to 80 mass %, respectively.

(5) A pressure-sensitive adhesive composition including the block copolymer composition according to any one of (1) to (4), and a tackifying resin.

(6) The pressure-sensitive adhesive composition according to (5), being used for a pressure-sensitive adhesive label.

(7) A pressure-sensitive adhesive sheet including a pressure-sensitive adhesive layer that includes the pressure-sensitive adhesive composition according to (5).

Advantageous Effects of Invention

The aspects of the invention thus provide a pressure-sensitive adhesive composition that exhibits excellent initial adhesion at a low temperature and excellent holding power at a high temperature, and exhibits excellent pressure-sensitive adhesive performance and an excellent die-cutting capability when used for a pressure-sensitive adhesive label, and a block copolymer composition that is used to produce the pressure-sensitive adhesive composition.

DESCRIPTION OF EMBODIMENTS

The exemplary embodiments of the invention are described in detail below.

1) Block Copolymer Composition

A block copolymer composition according to one embodiment of the invention includes an aromatic vinyl-isoprene-aromatic vinyl triblock copolymer (A) and an aromatic vinyl-isoprene diblock copolymer (B),
(i) a ratio ($Mw_{Da}/Mw_{Db}$) of a weight average molecular weight $Mw_{Da}$ of a polyisoprene block in the triblock copolymer (A) to a weight average molecular weight $Mw_{Db}$ of a polyisoprene block in the diblock copolymer (B) being 0.5 or more to less than 1,
(ii) a ratio of an aromatic vinyl monomer unit in all polymer components of the block copolymer composition being 10 to 30 mass %, and
(iii) the block copolymer composition having a breaking strength of less than 8 MPa and an elongation at break of less than 1,100%.

Aromatic Vinyl-Isoprene-Aromatic Vinyl Triblock Copolymer (A)

The aromatic vinyl-isoprene-aromatic vinyl triblock copolymer (A) (hereinafter may be referred to as "triblock copolymer (A)") used in connection with one embodiment of the invention is a polyaromatic vinyl block-polyisoprene block-polyaromatic vinyl block triblock copolymer.

The polyaromatic vinyl block (hereinafter may be referred to as "polyaromatic vinyl block (a)") included in the triblock copolymer (A) refers to a part of the polymer chain of the triblock copolymer (A) that includes an aromatic vinyl monomer unit as the main structural unit.

It is preferable that the polyaromatic vinyl block (a) include an aromatic vinyl monomer unit in a ratio of 80 mass % or more, and more preferably 100 mass %. If the polyaromatic vinyl block (a) includes an aromatic vinyl monomer unit in too small a ratio, the resulting pressure-sensitive adhesive composition may exhibit inferior holding power at a high temperature.

Examples of the aromatic vinyl monomer used to produce the polyaromatic vinyl block (a) include styrene; an alkyl-substituted styrene such as α-methylstyrene, o-methylstyrene, m-methyl styrene, p-methyl styrene, 2,4-dimethyl styrene, ethyl styrene, and p-tert-butylstyrene; a halogen-substituted styrene such as 4-chlorostyrene, 2-bromostyrene, and 3,5-difluorostyrene; an alkoxy-substituted styrene such as 4-methoxystyrene and 3,5-dimethoxystyrene; and the like. Among these, styrene and an alkyl-substituted styrene are preferable, and styrene is particularly preferable, from the viewpoint of pressure-sensitive adhesive performance, die-cutting capability, and availability.

The polyaromatic vinyl block (a) may be a block that is obtained by copolymerizing an aromatic vinyl monomer and an additional monomer that is copolymerizable with the aromatic vinyl monomer, as long as the advantageous effects of the invention are substantially not impaired.

Specific examples of the additional monomer that is copolymerizable with the aromatic vinyl monomer include a conjugated diene monomer such as 1,3-butadiene, isoprene, 2,3-dimethyl-1,3-butadiene, and 1,3-pentadiene.

The weight average molecular weight of the polyaromatic vinyl block (a) is preferably 5,000 to 100,000, more preferably 6,000 to 80,000, and particularly preferably 7,000 to 70,000. If the weight average molecular weight of the polyaromatic vinyl block (a) is too low, the resulting pressure-sensitive adhesive composition may exhibit inferior holding power at a high temperature. If the weight average molecular weight of the polyaromatic vinyl block (a) is too high, the block copolymer composition and the pressure-sensitive adhesive composition may have high melt viscosity, and handling may become difficult.

The ratio (Mw/Mn) of the weight average molecular weight (Mw) to the number average molecular weight (Mn) of the polyaromatic vinyl block (a) is preferably 2 or less, and more preferably 1.5 or less. When the ratio (Mw/Mn) is small, it is possible to obtain a pressure-sensitive adhesive composition that exhibits better holding power at a high temperature.

The triblock copolymer (A) normally includes an aromatic vinyl monomer unit in a ratio of 15 to 75 mass %, preferably 17 to 60 mass %, and more preferably 20 to 50 mass %. When the triblock copolymer (A) includes an aromatic vinyl monomer unit in a ratio within the above range, it is possible to efficiently obtain a pressure-sensitive adhesive composition that exhibits excellent pressure-sensitive adhesive performance and an excellent die-cutting capability.

Note that the two polyaromatic vinyl blocks (a) included in the triblock copolymer (A) may be either identical to or different from each other.

The polyisoprene block (hereinafter may be referred to as "polyisoprene block (a)") included in the triblock copolymer (A) refers to a part of the polymer chain of the triblock copolymer (A) that includes an isoprene unit as the main structural unit. It is preferable that the polyisoprene block (a) include an isoprene unit in a ratio of 80 mass % or more, and more preferably 100 mass %. If the polyisoprene block (a) includes an isoprene unit in too small a ratio, the resulting pressure-sensitive adhesive composition may exhibit inferior initial adhesion at a low temperature.

The polyisoprene block (a) may be a block that is obtained by copolymerizing isoprene and an additional monomer that is copolymerizable with isoprene, as long as the advantageous effects of the invention are substantially not impaired. Specific examples of the additional monomer that is copolymerizable with isoprene include the aromatic vinyl monomers mentioned above; a conjugated diene monomer other than isoprene, such as 1,3-butadiene, 2,3-dimethyl-1,3-butadiene, and 1,3-pentadiene; and the like.

The weight average molecular weight of the polyisoprene block (a) is preferably 70,000 to 290,000, more preferably 90,000 to 240,000, and particularly preferably 100,000 to 220,000. If the weight average molecular weight of the polyisoprene block (a) is too low, the resulting pressure-sensitive adhesive composition may exhibit inferior holding power at a high temperature. If the weight average molecular weight of the polyisoprene block (a) is too high, the block copolymer composition and the pressure-sensitive adhesive composition may have high melt viscosity, and handling may become difficult.

The ratio (Mw/Mn) of the weight average molecular weight (Mw) to the number average molecular weight (Mn) of the polyisoprene block (a) is preferably 2 or less, and more preferably 1.5 or less. When the ratio (Mw/Mn) is small, it is possible to obtain a pressure-sensitive adhesive composition that exhibits better holding power at a high temperature.

The polyisoprene block (a) may include a vinyl bond (—CH=CH$_2$)-containing isoprene unit in an arbitrary ratio. The polyisoprene block (a) normally includes a vinyl bond-containing isoprene unit in a ratio of 50 mass % or less, preferably 20 mass % or less, and more preferably 5 to 10 mass %. When the polyisoprene block (a) includes a vinyl bond-containing isoprene unit in a ratio within the above range, it is possible to obtain a pressure-sensitive adhesive composition that exhibits better initial adhesion at a low temperature.

The weight average molecular weight of the triblock copolymer (A) is normally 80,000 to 300,000, preferably 100,000 to 250,000, more preferably 110,000 to 230,000, and particularly preferably 120,000 to 220,000. If the weight average molecular weight of the triblock copolymer (A) is too low, the resulting pressure-sensitive adhesive composition may exhibit inferior holding power at a high temperature. If the weight average molecular weight of the triblock copolymer (A) is too high, the pressure-sensitive adhesive composition may have high melt viscosity, and handling may become difficult.

The ratio (Mw/Mn) of the weight average molecular weight (Mw) to the number average molecular weight (Mn) of the triblock copolymer (A) is preferably 2 or less, and more preferably 1.5 or less. When the ratio (Mw/Mn) is small, it is possible to obtain a pressure-sensitive adhesive composition that exhibits better holding power at a high temperature.

The block copolymer composition according to one embodiment of the invention normally includes the triblock copolymer (A) in a ratio of 10 to 90 mass %, preferably 15 to 85 mass %, and more preferably 20 to 80 mass %. If the block copolymer composition includes the triblock copolymer (A) in too small a ratio, the resulting pressure-sensitive adhesive composition may exhibit inferior holding power at a high temperature. If the block copolymer composition includes the triblock copolymer (A) in too large a ratio, the pressure-sensitive adhesive composition may exhibit inferior initial adhesion and die-cutting capability.

Aromatic Vinyl-Isoprene Diblock Copolymer (B)

The aromatic vinyl-isoprene diblock copolymer (B) (hereinafter may be referred to as "diblock copolymer (B)") used in connection with one embodiment of the invention is a polyaromatic vinyl block-polyisoprene block diblock copolymer.

The polyaromatic vinyl block (hereinafter may be referred to as "polyaromatic vinyl block (b)") included in the diblock copolymer (B) refers to a part of the polymer chain of the diblock copolymer (B) that includes an aromatic vinyl monomer unit as the main structural unit.

It is preferable that the polyaromatic vinyl block (b) include an aromatic vinyl monomer unit in a ratio of 80 mass % or more, and more preferably 100 mass %. If the polyaromatic vinyl block (b) includes an aromatic vinyl monomer unit in too small a ratio, the resulting pressure-sensitive adhesive composition may exhibit inferior holding power at a high temperature.

Examples of the aromatic vinyl monomer that is used to obtain the polyaromatic vinyl block (b) include those mentioned above in connection with the aromatic vinyl monomer that is used to obtain the polyaromatic vinyl block (a). Among these, styrene and an alkyl-substituted styrene are preferable, and styrene is particularly preferable.

The polyaromatic vinyl block (b) may be a block that is obtained by copolymerizing an aromatic vinyl monomer and an additional monomer that is copolymerizable with the aromatic vinyl monomer, as long as the advantageous effects of the invention are substantially not impaired.

Examples of the additional monomer that is copolymerizable with the aromatic vinyl monomer include a conjugated diene monomer such as 1,3-butadiene, isoprene, 2,3-dimethyl-1,3-butadiene, and 1,3-pentadiene.

The weight average molecular weight of the polyaromatic vinyl block (b) is preferably 5,000 to 100,000, more preferably 6,000 to 80,000, and particularly preferably 7,000 to 70,000. If the weight average molecular weight of the polyaromatic vinyl block (b) is too low, the resulting pressure-sensitive adhesive composition may exhibit inferior holding power at a high temperature. If the weight average molecular weight of the polyaromatic vinyl block (b) is too high, the pressure-sensitive adhesive composition may have high melt viscosity, and handling may become difficult.

The ratio (Mw/Mn) of the weight average molecular weight (Mw) to the number average molecular weight (Mn) of the polyaromatic vinyl block (b) is preferably 2 or less, and more preferably 1.5 or less. When the ratio (Mw/Mn) is small, it is possible to obtain a pressure-sensitive adhesive composition that exhibits better holding power at a high temperature.

The polyisoprene block (hereinafter may be referred to as "polyisoprene block (b)") included in the diblock copolymer (B) refers to a part of the polymer chain of the diblock copolymer (B) that includes an isoprene unit as the main structural unit.

It is preferable that the polyisoprene block (b) include an isoprene unit in a ratio of 80 mass % or more, and more preferably 100 mass %. If the polyisoprene block (b) includes an isoprene unit in too small a ratio, the resulting pressure-sensitive adhesive composition may exhibit inferior initial adhesion at a low temperature.

The polyisoprene block (b) may be a block that is obtained by copolymerizing isoprene and an additional monomer that is copolymerizable with isoprene, as long as the advantageous effects of the invention are substantially not impaired. Examples of the additional monomer that is copolymerizable with isoprene include the aromatic vinyl monomers mentioned above; a conjugated diene monomer other than isoprene, such as 1,3-butadiene, 2,3-dimethyl-1, 3-butadiene, and 1,3-pentadiene; and the like.

The weight average molecular weight of the polyisoprene block (b) is preferably 70,000 to 390,000, more preferably 90,000 to 290,000, and particularly preferably 100,000 to 270,000. If the weight average molecular weight of the polyisoprene block (b) is too low, the resulting pressure-sensitive adhesive composition may exhibit inferior holding power at a high temperature. If the weight average molecular weight of the polyisoprene block (b) is too high, the block copolymer composition and the pressure-sensitive adhesive composition may have high melt viscosity, and handling may become difficult.

The ratio (Mw/Mn) of the weight average molecular weight (Mw) to the number average molecular weight (Mn) of the polyisoprene block (b) is preferably 2 or less, and more preferably 1.5 or less. When the ratio (Mw/Mn) is small, it is possible to obtain a pressure-sensitive adhesive composition that exhibits better holding power at a high temperature.

The diblock copolymer (B) normally includes an aromatic vinyl monomer unit in a ratio of 8 to 50 mass %, preferably 10 to 40 mass %, and more preferably 12 to 30 mass %. If the diblock copolymer (B) includes an aromatic vinyl monomer unit in too small a ratio, the resulting pressure-sensitive adhesive composition may exhibit inferior holding power at a high temperature. If the diblock copolymer (B) includes an aromatic vinyl monomer unit in too large a ratio, the pressure-sensitive adhesive composition may exhibit inferior initial adhesion at a low temperature.

The diblock copolymer (B) may include a vinyl bond (—CH=CH$_2$)-containing isoprene unit in an arbitrary ratio. The diblock copolymer (B) normally includes a vinyl bond-containing isoprene unit in a ratio of 50 mass % or less, preferably 20 mass % or less, and more preferably 5 to 10 mass %. When the diblock copolymer (B) includes a vinyl bond-containing isoprene unit in a ratio within the above range, it is possible to obtain a pressure-sensitive adhesive composition that exhibits better initial adhesion at a low temperature.

The weight average molecular weight of the diblock copolymer (B) is normally 80,000 to 400,000, preferably 90,000 to 350,000, more preferably 100,000 to 300,000, and particularly preferably 110,000 to 280,000. If the weight average molecular weight of the diblock copolymer (B) is too low, the resulting pressure-sensitive adhesive composition tends to exhibit inferior holding power at a high temperature. If the weight average molecular weight of the diblock copolymer (B) is too high, the pressure-sensitive adhesive composition may have high melt viscosity, and handling may become difficult.

The ratio (Mw/Mn) of the weight average molecular weight (Mw) to the number average molecular weight (Mn) of the diblock copolymer (B) is preferably 2 or less, and more preferably 1.5 or less. When the ratio (Mw/Mn) is small, it is possible to efficiently obtain a pressure-sensitive adhesive composition that exhibits excellent holding power at a high temperature.

The block copolymer composition normally includes the diblock copolymer (B) in a ratio of 10 to 90 mass %, preferably 20 to 80 mass %, and more preferably 25 to 75 mass %.

When the block copolymer composition includes the diblock copolymer (B) in a ratio within the above range, it is possible to obtain a pressure-sensitive adhesive composition that exhibits excellent holding power at a high temperature and an excellent die-cutting capability.

The ratio ($Mw_{Da}/Mw_{Db}$) of the weight average molecular weight $Mw_{Da}$ of the polyisoprene block (a) in the triblock copolymer (A) to the weight average molecular weight $Mw_{Db}$ of the polyisoprene block (b) in the diblock copolymer (B) is 0.5 or more to less than 1, preferably 0.52 to 0.98, more preferably 0.55 to 0.95, and still more preferably 0.58 to 0.92.

The block copolymer composition according to one embodiment of the invention has a ratio of an aromatic vinyl monomer unit in all polymer components of the block copolymer composition being 10 to 30 mass %, preferably 11 to 29 mass %, more preferably 12 to 27 mass %, and still more preferably 13 to 26 mass %.

The block copolymer composition according to one embodiment of the invention has a breaking strength of less than 8 MPa, preferably less than 7.8 MPa, more preferably less than 7.6 MPa, and still more preferably less than 7.5 MPa, and has an elongation at break of less than 1,100%, preferably less than 1,080%, more preferably less than 1,060%, and still more preferably less than 1,050%.

When the ratio ($Mw_{Da}/Mw_{Db}$) of the weight average molecular weight $Mw_{Da}$ to the weight average molecular weight $Mw_{Db}$ is within the above range, the ratio of an aromatic vinyl monomer unit in all polymer components of the block copolymer composition is within the above range, and the block copolymer composition has a breaking strength and an elongation at break within the above ranges, it is possible to obtain a pressure-sensitive adhesive composition that exhibits excellent initial adhesion at a low temperature and excellent holding power at a high temperature, and exhibits excellent pressure-sensitive adhesive performance and an excellent die-cutting capability when used for a pressure-sensitive adhesive label. The pressure-sensitive adhesive composition also exhibits excellent peel adhesion strength at room temperature.

It is preferable that the block copolymer composition according to one embodiment of the invention be designed so that the triblock copolymer (A) has a weight average molecular weight of 100,000 to 250,000, and the diblock copolymer (B) has a weight average molecular weight of 100,000 to 300,000, since the advantageous effects of the invention are achieved in a well-balanced manner.

It is preferable that the block copolymer composition according to one embodiment of the invention be designed so that the ratio ($Ar^a/Ar^b$) of the aromatic vinyl monomer unit content $Ar^a$ in the triblock copolymer (A) to the aromatic vinyl monomer unit content $Ar^b$ in the diblock copolymer (B) is 1.5 or more, more preferably 1.6 or more, and still more preferably 1.7 to 4.0.

When the ratio ($Ar^a/Ar^b$) of the aromatic vinyl monomer unit content $Ar^a$ to the aromatic vinyl monomer unit content $Ar^b$ is within the above range, it is possible to efficiently obtain a pressure-sensitive adhesive composition that exhibits excellent initial adhesion at a low temperature and excellent holding power at a high temperature, and exhibits excellent pressure-sensitive adhesive performance and an excellent die-cutting capability when used for a pressure-sensitive adhesive label.

It is preferable that the block copolymer composition according to one embodiment of the invention include the triblock copolymer (A) and the diblock copolymer (B) in a ratio of 20 to 80 mass %, respectively, since the advantageous effects of the invention are achieved in a well-balanced manner.

The mass ratio (AB) of the triblock copolymer A to the diblock copolymer B in the block copolymer composition according to one embodiment of the invention is normally 10/90 to 70/30, and preferably 15/85 to 60/40, since the advantageous effects of the invention are achieved in a satisfactory manner.

The weight average molecular weight of the block copolymer composition according to one embodiment of the invention is not particularly limited, but is normally 150,000 to 300,000 so that the advantageous effects of the invention are achieved in a satisfactory manner.

Production of Triblock Copolymer (A) and Diblock Copolymer (B)

The triblock copolymer (A) may be produced using an arbitrary method. A known production method may be used to produce the triblock copolymer (A). For example, the triblock copolymer (A) may be produced using a method that sequentially polymerizes a polyaromatic vinyl block and a polyisoprene block by means of an anionic living polymerization method, or a method that produces block copolymers having a living active terminal, and couples the block copolymers using a coupling agent described later.

The diblock copolymer (B) may be produced using an arbitrary method. A known production method may be used to produce the diblock copolymer (B). For example, the diblock copolymer (B) may be produced using a method that sequentially polymerizes a polyaromatic vinyl block and a polyisoprene block by means of an anionic living polymerization method.

The triblock copolymer (A) and the diblock copolymer (B) may be produced separately as described above, or may be produced in the form of a mixture that includes the triblock copolymer (A) and the diblock copolymer (B) as described below by means of an anionic living polymerization method.

In this case, the first to fifth steps listed below are performed.

First step: An aromatic vinyl monomer is polymerized in a polymerization solvent using an anionic polymerization initiator to produce a polyaromatic vinyl block having a living active terminal.

Second step: Isoprene is polymerized from the living active terminal of the polyaromatic vinyl block to obtain an aromatic vinyl-isoprene diblock copolymer having a living active terminal.

Third step: Part of the aromatic vinyl-isoprene diblock copolymer having a living active terminal is reacted with a coupling agent to obtain an aromatic vinyl-isoprene-aromatic vinyl block copolymer (corresponding to the component (A)). In this case, the amount of coupling agent is adjusted so that the amount of reactive group is less than 1 molar equivalent with respect to the active terminal of the aromatic vinyl-isoprene diblock copolymer.

Fourth step: Isoprene is added to the solution obtained by the third step to react the living active terminal of the aromatic vinyl-isoprene diblock copolymer with isoprene.

Fifth step: The living active terminal of the aromatic vinyl-isoprene diblock copolymer is deactivated using a polymerization terminator to obtain an aromatic vinyl-isoprene diblock copolymer (corresponding to the component (B)).

The first to fifth steps are described below.

In the first step, an aromatic vinyl monomer is polymerized in a polymerization solvent using an anionic polymerization initiator to produce a polyaromatic vinyl block having a living active terminal.

The polymerization solvent is not particularly limited as long as the polymerization solvent is inert to the polymerization initiator. Examples of the polymerization solvent include a linear hydrocarbon solvent, a cyclic hydrocarbon solvent, and a mixed solvent thereof.

Examples of the linear hydrocarbon solvent include n-butane, isobutane, n-hexane, 1-butene, isobutylene, trans-2-butene, cis-2-butene, 1-pentene, trans-2-pentene, cis-2-pentene, n-pentane, trans-2-pentane, neopentane, a mixture thereof, and the like.

Examples of the cyclic hydrocarbon solvent include benzene, toluene, xylene, cyclohexane, and the like.

It is preferable to use a mixture that includes a linear hydrocarbon solvent and a cyclic hydrocarbon solvent since it is possible to easily control the polymerization temperature and the molecular weight of the polymer.

When a mixture that includes a linear hydrocarbon solvent and a cyclic hydrocarbon solvent is used, the linear hydrocarbon solvent and the cyclic hydrocarbon solvent are preferably mixed in a mass ratio (linear hydrocarbon solvent:cyclic hydrocarbon solvent) of 5:95 to 50:50, and more preferably 10:90 to 40:60.

The polymerization solvent is used in a ratio of 100 to 1,000 parts by mass, and preferably 150 to 400 parts by mass, based on 100 parts by mass of the monomers used in the first to fourth steps in total.

The anionic polymerization initiator is not particularly limited. A known anionic polymerization initiator that is used when subjecting an aromatic vinyl monomer and isoprene to anionic polymerization, may be appropriately used. Specific examples of the anionic polymerization initiator include an organic monolithium initiator such as methyllithium, n-propyllithium, n-butyllithium, and sec-butyllithium. Among these, n-butyllithium is preferable. The polymerization initiator may be used in an appropriate amount so that a polymer having the desired weight average molecular weight is obtained using an ordinary method.

It is preferable to effect polymerization in the presence of a polar compound since it is possible to easily control the polymerization rate, and produce a polymer having a narrow molecular weight distribution.

The term "polar compound" used herein refers to a compound of which molecule has electrical polarity. More specifically, the term "polar compound" used herein refers to a compound that preferably has a relative permittivity (relative dielectric constant) at 25° C. of 2.5 to 5.0.

Examples of the polar compound include an aromatic ether such as diphenyl ether and anisole; an aliphatic ether such as diethyl ether and dibutyl ether; a tertiary monoamine such as trimethylamine, triethylamine, and tripropylamine; a tertiary polyamine such as N,N,N',N'-tetramethylethylenediamine and N,N,N',N'-tetraethylethylenediamine; and the like. Among these, N,N,N',N'-tetramethylethylenediamine is preferable.

The polar compound is preferably used in an amount of 0.05 to 0.5 mol, and more preferably 0.01 to 0.1 mol, based on 1 mol of the anionic polymerization initiator.

In the second step, isoprene is polymerized from the living active terminal of the polyaromatic vinyl block to obtain an aromatic vinyl-isoprene diblock copolymer having a living active terminal.

In the second step, it is preferable to react isoprene while continuously adding isoprene in order to reduce or suppress a situation in which the heat of reaction is produced rapidly.

In the third step, part of the aromatic vinyl-isoprene diblock copolymer having a living active terminal is reacted with a coupling agent to obtain an aromatic vinyl-isoprene-aromatic vinyl block copolymer (corresponding to the triblock copolymer (A)).

The coupling agent is a compound that includes two moieties that react with the living active terminal of the polymer molecule, and are bonded to the polymer molecule.

Examples of a bifunctional coupling agent that has two reaction sites include a bifunctional halogenated silane such as dichlorosilane, monomethyldichlorosilane, and dimethyldichlorosilane; a bifunctional alkoxysilane such as diphenyldimethoxysilane and diphenyldiethoxysilane; a bifunctional halogenated alkane such as dichloroethane, dibromoethane, methylene chloride, and dibromomethane; a bifunctional halogenated tin such as dichlorotin, monomethyldichlorotin, dimethyldichlorotin, monoethyldichlorotin, diethyldichlorotin, monobutyldichlorotin, and dibutyldichlorotin; benzoic acid; CO; 2-chloropropene; and the like. Among these, dimethyldichlorosilane is preferable. The coupling agent may be used in an appropriate amount so that the amount of aromatic vinyl-isoprene-aromatic vinyl block copolymer (corresponding to the triblock copolymer (A)) obtained by coupling falls within the desired range.

In the fourth step, the living active terminal of the aromatic vinyl-isoprene diblock copolymer is reacted with isoprene.

When isoprene is added, a polyisoprene chain is grown from the active terminal of the aromatic vinyl-isoprene diblock copolymer that has not reacted with the coupling agent. The weight average molecular weight of the polyisoprene block in the diblock copolymer (B) can thus be increased as compared with the weight average molecular weight of the polyisoprene block in the triblock copolymer (A).

In the fifth step, the living active terminal of the aromatic vinyl-isoprene diblock copolymer is deactivated using a polymerization terminator to obtain an aromatic vinyl-isoprene diblock copolymer (corresponding to the diblock copolymer (B)).

A polymerization terminator that is commonly used for anionic living polymerization may be used as the polymerization terminator. Specific examples of the polymerization terminator include water; an alcohol such as methyl alcohol and ethyl alcohol; an inorganic acid such as hydrochloric acid; an organic acid such as acetic acid; a monofunctional silane compound such as chlorotrimethylsilane; and the like.

A solution that includes a mixture including the triblock copolymer (A) and the diblock copolymer (B) can thus be obtained. An antioxidant may optionally be added to the solution.

The polymers are separated from the solution using a known polymer separation method (e.g., steam stripping), and dried to obtain a mixture including the triblock copolymer (A) and the diblock copolymer (B).

When producing a mixture including the triblock copolymer (A) and the diblock copolymer (B) using the above method, the mixture normally includes the triblock copolymer (A) in a ratio of 10 mass % or more, preferably 20 mass % or more, and particularly preferably 25 mass % or more, based on the total amount of the triblock copolymer (A) and the diblock copolymer (B). The mixture normally includes the triblock copolymer (A) in a ratio of 60 mass % or less based on the total amount of the triblock copolymer (A) and the diblock copolymer (B). When the mixture includes the triblock copolymer (A) in a ratio within the above range, it is possible to produce a block copolymer composition having a preferable composition without adding the triblock copolymer (A) that has been produced separately.

The ratio of the triblock copolymer (A) based on the total amount of the triblock copolymer (A) and the diblock copolymer (B) can be adjusted by adjusting the amount of coupling agent.

The block copolymer composition according to one embodiment of the invention may include a known antioxidant, UV absorber, anti-blocking agent, filler, pigment, and the like in the desired amount.

The block copolymer composition according to one embodiment of the invention may be produced using an arbitrary method. For example, the block copolymer composition according to one embodiment of the invention may be produced using a method that mixes the triblock copolymer (A) and the diblock copolymer (B) that have been produced or obtained separately in a given ratio, a method that mixes the triblock copolymer (A) and the diblock copolymer (B) in a given ratio in a solution state, separates the polymers using a known method, and dries the separated polymers, a method that uses a mixture including the triblock copolymer (A) and the diblock copolymer (B) obtained as described above directly as the polymer component, or the like.

2) Pressure-Sensitive Adhesive Composition

A pressure-sensitive adhesive composition according to one embodiment of the invention includes the block copolymer composition according to one embodiment of the invention, and a tackifying resin.

The tackifying resin is not particularly limited. A known natural resin-based tackifying resin, a known synthetic resin-based tackifying resin, and the like that are used to produce a pressure-sensitive adhesive composition may be used.

Examples of the natural resin-based tackifying resin include a rosin-based resin, a terpene-based resin, and the like.

Examples of the rosin-based resin include a rosin such as gum rosin, tall oil rosin, and wood rosin; a modified rosin such as hydrogenated rosin, disproportionated rosin, and polymerized rosin; a rosin ester such as a glycerol ester of a modified rosin, and a pentaerythritol ester of a modified rosin; and the like.

Examples of the terpene-based resin include an α-pinene-based terpene resin, a β-pinene-based terpene resin, a dipentene (limonene)-based terpene resin, an aromatic modified terpene resin, a hydrogenated terpene resin, a terpene phenolic resin, and the like.

Synthetic resin-based tackifying resins are roughly classified into a polymerization-type tackifying resin and a condensation-type tackifying resin. Examples of the polymerization-type tackifying resin include a petroleum resin such as an aliphatic ($C_5$-based) petroleum resin, an aromatic ($C_9$-based) petroleum resin, a copolymerization-type ($C_5$-$C_9$-based) petroleum resin, a hydrogenated petroleum resin, and an alicyclic petroleum resin; a cumarone-indene resin; and a pure monomer-based petroleum resin such as a styrene-based petroleum resin and a substituted styrene-based petroleum resin. Examples of the condensation-type tackifier include a phenol-based resin such as an alkylphenol resin and a rosin-modified phenolic resin, a xylene resin, and the like.

Among these, a petroleum resin is preferable, a copolymerization-type petroleum resin in which the copolymerization ratio of an aliphatic petroleum resin and an aromatic monomer is 30 mass % or less is more preferable, and a copolymerization-type petroleum resin in which the copolymerization ratio of an aromatic monomer is 25 mass % or less is particularly preferable.

The tackifying resin is normally used in a ratio of 10 to 500 parts by mass, preferably 50 to 350 parts by mass, and more preferably 70 to 250 parts by mass, based on 100 parts by mass of the block copolymer composition according to one embodiment of the invention.

The pressure-sensitive adhesive composition according to one embodiment of the invention may include an additional elastomer other than the block copolymers (A) and (B) in the desired amount as long as the advantageous effects of the invention are substantially not impaired.

Examples of the additional elastomer include a styrene-butadiene-styrene block copolymer, a styrene-ethylene-butylene-styrene block copolymer, a styrene-ethylene-propylene-styrene block copolymer, polybutadiene, polyisoprene, natural rubber, and the like.

The pressure-sensitive adhesive composition according to one embodiment of the invention may optionally include an additional component such as a softener, an antioxidant, a UV absorber, and a filler.

Examples of the softener include an extender oil such as an aromatic process oil, a paraffinic process oil, and a naphthenic process oil; a liquid polymer such as polybutene and polyisobutylene; and the like. Among these, an extender oil such as a paraffinic process oil and a naphthenic process oil is preferable.

The softener is preferably used in a ratio of 5 to 500 parts by mass, more preferably 10 to 300 parts by mass, and particularly preferably 10 to 150 parts by mass, based on 100 parts by mass of the block copolymer composition according to one embodiment of the invention. If the softener is used in too small a ratio, the pressure-sensitive adhesive composition may have high melt viscosity, and handling may become difficult. If the softener is used in too large a ratio, there may be a tendency that the softener easily bleeds out.

Examples of the antioxidant include a hindered phenol-based compound such as 2,6-di-tert-butyl-p-cresol and pentaerythritol tetrakis[3-(3,5-di-tert-butyl-4-hydroxyphenyl) propionate]; a thiodicarboxylate ester such as dilauryl thiopropionate and distearyl thiodipropionate; a phosphite such as tris(nonylphenyl) phosphite and 4,4'-butylidenebis (3-methyl-6-tert-butylphenyl)ditridecyl phosphite; and the like. The antioxidant may be used in an appropriate ratio taking account of the properties of the antioxidant, and the properties required for the pressure-sensitive adhesive composition.

The pressure-sensitive adhesive composition according to one embodiment of the invention may be produced by mixing the block copolymer composition according to one embodiment of the invention, the tackifying resin, and an optional additional component.

The pressure-sensitive adhesive composition according to one embodiment of the invention may be produced using an arbitrary method. A known method may be used to produce the pressure-sensitive adhesive composition according to one embodiment of the invention. For example, the pressure-sensitive adhesive composition according to one embodiment of the invention may be produced using a method that melt-mixes each component at a high temperature (about 160 to 180° C.) in a nitrogen atmosphere.

The pressure-sensitive adhesive composition according to one embodiment of the invention thus obtained exhibits excellent initial adhesion at a low temperature and excellent holding power at a high temperature, and exhibits excellent pressure-sensitive adhesive performance and an excellent die-cutting capability when used for a pressure-sensitive adhesive label. The pressure-sensitive adhesive composition according to one embodiment of the invention also exhibits excellent peel adhesion strength at room temperature.

3) Pressure-Sensitive Adhesive Sheet

A pressure-sensitive adhesive sheet according to one embodiment of the invention includes a pressure-sensitive adhesive layer that includes the pressure-sensitive adhesive composition according to one embodiment of the invention.

The pressure-sensitive adhesive layer is normally formed by applying the pressure-sensitive adhesive composition according to one embodiment of the invention to a support, and drying the applied composition.

The support is not particularly limited. Examples of the support include paper such as kraft paper, Japanese paper, high-quality paper, and synthetic paper; cloth such as cotton cloth, staple fiber cloth, and polyester cloth; a resin film such as a cellophane film, a polyvinyl chloride film, a polypropylene film, and a polyethylene film; a metal foil such as aluminum foil and copper foil; a nonwoven fabric such as a polyester nonwoven fabric and a rayon nonwoven fabric; and the like.

The surface of the support may be subjected to a corona discharge treatment, or provided with a primary coating agent in advance.

The pressure-sensitive adhesive composition according to one embodiment of the invention may be applied using an arbitrary method. A known method may be used to apply the pressure-sensitive adhesive composition according to one embodiment of the invention. For example, the pressure-sensitive adhesive composition according to one embodiment of the invention may be applied using a method that dissolves the pressure-sensitive adhesive composition according to one embodiment of the invention in an appropriate organic solvent, adjusts the viscosity of the solution, and applies the resulting coating liquid, a method that melts the pressure-sensitive adhesive composition by heating, and applies the molten pressure-sensitive adhesive composition directly to the support, a method that disperses the pressure-sensitive adhesive composition in water to prepare an emulsion, and applies the emulsion to the support, or the like.

Examples of the organic solvent used to dissolve the pressure-sensitive adhesive composition include an aliphatic hydrocarbon such as n-hexane and cyclohexane; an aromatic hydrocarbon such as benzene, toluene, and xylene; halides thereof; and the like.

The pressure-sensitive adhesive layer can be formed by applying a coating liquid that includes the pressure-sensitive adhesive composition to the support, and drying the applied coating liquid.

Since the pressure-sensitive adhesive layer is formed using the pressure-sensitive adhesive composition according to one embodiment of the invention, the pressure-sensitive adhesive layer exhibits excellent pressure-sensitive adhesive performance and an excellent die-cutting capability.

The thickness of the pressure-sensitive adhesive layer is normally 10 to 100 μm, and preferably 20 to 70 μm.

The pressure-sensitive adhesive sheet according to one embodiment of the invention may be cut or stamped to have an appropriate shape corresponding to the application, for example. The pressure-sensitive adhesive layer included in the pressure-sensitive adhesive sheet according to one embodiment of the invention need not necessarily be formed continuously. For example, the pressure-sensitive adhesive layer may be formed in a regular or random pattern (e.g., dot-like pattern and a striped pattern).

The pressure-sensitive adhesive sheet according to one embodiment of the invention has a structure in which the pressure-sensitive adhesive layer that is formed using the pressure-sensitive adhesive composition according to one embodiment of the invention is secured on at least one side of the support on the assumption that the pressure-sensitive adhesive layer is not intentionally removed from the support. The term "pressure-sensitive adhesive sheet" used herein includes a pressure-sensitive adhesive tape, a pressure-sensitive adhesive film, a pressure-sensitive adhesive label, and the like. Since the pressure-sensitive adhesive sheet according to one embodiment of the invention includes the pressure-sensitive adhesive layer that includes the pressure-sensitive adhesive composition according to one embodiment of the invention that exhibits an excellent die-cutting capability, the pressure-sensitive adhesive sheet according to one embodiment of the invention is particularly suitable as a pressure-sensitive adhesive label that is cut using a die.

EXAMPLES

The invention is further described below by way of examples and comparative examples. Note that the units "parts" and "%" used in connection with the examples respectively refer to "parts by mass" and "mass %" unless otherwise indicated.

The measurement methods described below were used in connection with the examples.

Weight Average Molecular Weight of Block Copolymer Composition and Each Block Copolymer Included in Block Copolymer Composition The weight average molecular weight (polystyrene-equivalent molecular weight) of the block copolymer composition and each block copolymer included in the block copolymer composition was determined by high-performance liquid chromatography (flow rate: 0.35 mL/min, carrier: tetrahydrofuran). The high-performance liquid chromatography was performed using a GPC system ("HLC8220" manufactured by Tosoh Corporation) in which three columns ("Shodex (registered trademark) KF-404HQ" manufactured by Showa Denko K.K.) were connected (column temperature: 40° C.). A differential refractometer and an ultraviolet detector were used as a detector, and the molecular weight was calibrated (12 points) using standard polystyrene (manufactured by Polymer Laboratories Ltd., molecular weight: 500 to 3,000,000).

Content (Ratio) of Each Block Copolymer in Block Copolymer Composition

The content (ratio) of each block copolymer in the block copolymer composition was calculated from the area ratio of the peak corresponding to each block copolymer that was observed in a chart obtained by the high-performance liquid chromatography.

Weight Average Molecular Weight of Styrene Polymer Block in Block Copolymer

The block copolymer was reacted with ozone, and reduced using lithium aluminum hydride in accordance with the method described in Rubber Chem. Technol., 45, 1295 (1972) to decompose the isoprene polymer block in the block copolymer. Specifically, a reaction vessel charged with 100 mL of dichloromethane treated with a molecular sieve, was charged with 300 mg of the sample to effect dissolution. The reaction vessel was placed in a cooling bath, and cooled to −25° C., and ozone produced using an ozonizer was introduced into the reaction vessel while passing oxygen through the reaction vessel at a flow rate of 170 mL/min. When 30 minutes had elapsed from the start of the reaction, a gas that flowed out from the reaction vessel was introduced into a potassium iodide aqueous solution to confirm that the reaction had completed. The resulting reaction mixture is referred to as "reaction mixture 1".

Another reaction vessel in which the internal atmosphere had been replaced by nitrogen, was charged with 50 mL of diethyl ether and 470 mg of lithium aluminum hydride, and the reaction mixture 1 was slowly added dropwise to the reaction vessel while cooling the reaction vessel with ice water. The reaction vessel was placed in a water bath, and gradually heated, and the mixture was refluxed at 40° C. for 30 minutes. After completion of the reaction, dilute hydrochloric acid was added dropwise to the reaction vessel in small quantities while stirring the solution until the generation of hydrogen was hardly observed. The resulting reaction mixture is referred to as "reaction mixture 2". A solid product included in the reaction mixture 2 was filtered off. After the addition of 100 mL of diethyl ether to the solid product, the mixture was stirred for 10 minutes, and filtered to obtain an extract. The extract and the filtrate were mixed, and the solvent was evaporated from the mixture (solution) to obtain a solid sample.

The weight average molecular weight of the sample thus obtained was measured as described above, and taken as the weight average molecular weight of the styrene polymer block.

Weight Average Molecular Weight of Isoprene Polymer Block in Block Copolymer

The weight average molecular weight of the corresponding styrene polymer block (measured as described above) was subtracted from the weight average molecular weight of the block copolymer (measured as described above), and the weight average molecular weight of the isoprene polymer block was calculated based on the resulting value.

Styrene Unit Content in Block Copolymer

The styrene unit content in the block copolymer was calculated based on the detection intensity ratio of the differential refractometer and the ultraviolet detector during the high-performance liquid chromatography (see above). Note that a calibration curve was drawn in advance using copolymers that differ in styrene unit content.

Styrene Unit Content in (Entire) Block Copolymer Composition

The styrene unit content in the (entire) block copolymer composition was calculated based on the $^1$H-NMR measurement results.

Tensile Properties of Block Copolymer Composition

The block copolymer was press-formed at 170° C. to prepare a sheet having a thickness of 1 mm, and the breaking strength and the elongation at break of the sheet were measured in accordance with JIS K 6251. The dumbbell shape was in conformity with JIS-7113-2 (size: ½). When both the breaking strength and the elongation at break are low, the resulting label has an excellent die-cutting capability.

Initial Adhesion of Label-Forming Pressure-Sensitive Adhesive Composition

A pressure-sensitive adhesive tape having a width of 25 mm was used as a sample, and a high-density polyethylene (HDPE) sheet was used as an adherend. The initial adhesion of the label-forming pressure-sensitive adhesive composition was evaluated by measuring the loop tack value (N/25 mm) using a tensile tester (test speed: 1,000 mm/min, bonded area: 25×25 mm, temperature: 23° C.). A large measured value indicates that the initial adhesion was high.

Holding Power of Label-Forming Pressure-Sensitive Adhesive Composition

A pressure-sensitive adhesive tape having a width of 10 mm was used as a sample, and a mirror-finished SUS sheet was used as an adherend. The holding power of the label-forming pressure-sensitive adhesive composition was evaluated by measuring the time (min) until peeling occurred in accordance with PSTC-6 (holding power test specified by the Pressure Sensitive Tape Council) (bonded area: 10×25 mm, load: $3.92 \times 10^4$ Pa, temperature: 50° C.). A large measured value indicates that the holding power was high.

Example 1

A pressure-resistant reactor was charged with 23.3 kg of cyclohexane, 4.88 mmol of N,N,N',N'-tetramethylethylenediamine (hereinafter referred to as "TMEDA"), and 2.1 kg of styrene I. 162.73 mmol of n-butyllithium was added to the mixture while stirring the mixture at 40° C. After heating the reaction mixture to 50° C., a polymerization reaction was effected for 1 hour. The polymerization conversion ratio of styrene was 100%. 7.0 kg of isoprene I was continuously added to the reactor over 1 hour while maintaining the temperature of the reaction mixture at 50 to 60° C. After the addition, a polymerization reaction was effected for a further 1 hour. The polymerization conversion ratio of isoprene was 100%.

After the addition of 43.94 mmol of dimethyldichlorosilane (bifunctional coupling agent) (i.e., coupling agent) to the reaction mixture, a coupling reaction was effected for 2 hours to produce an aromatic vinyl-isoprene-aromatic vinyl triblock copolymer (A). 4.0 kg of isoprene II was continuously added to the reactor over 1 hour while maintaining the temperature of the reaction mixture at 50 to 60° C. After the addition, a polymerization reaction was effected for a further 1 hour to produce an aromatic vinyl-isoprene diblock copolymer (B). The polymerization conversion ratio of isoprene was 100%. The reaction was terminated by adding 244.1 mmol of methanol (polymerization terminator). The amount of each reagent used for the reaction is listed in Table 1.

0.36 parts of 2,6-di-tert-butyl-p-cresol (antioxidant) was added to 100 parts (polymer component: 36 parts) of the reaction mixture obtained as described above, and the mixture was mixed. The mixture (mixed solution) was added dropwise in small quantities to heated water (85 to 95° C.) to volatilize the solvent and collect a precipitate. The precipitate was pulverized, and dried with hot air at 85° C. to collect a composition (block copolymer composition) of Example 1.

The reaction mixture thus obtained was sampled, and the weight average molecular weight of each block copolymer included in the block copolymer composition, the content of each block copolymer in the block copolymer composition, the weight average molecular weight of the styrene polymer block in each block copolymer, the weight average molecular weight of the isoprene polymer block in each block copolymer, the styrene unit content in each block copolymer, and the styrene unit content in the (entire) block copolymer composition were determined.

The resulting block copolymer composition was press-formed at 170° C. to prepare a sheet having a thickness of 1 mm, and the tensile properties of the sheet were evaluated. The results are listed in Table 2.

Examples 2 and 3

Compositions of Examples 2 and 3 were obtained (collected) in the same manner as in Example 1, except that the amounts of styrene, n-butyllithium, TMEDA, isoprene, dimethyldichlorosilane, and methanol were changed as listed in Table 1. Various measurements were performed in the same manner as in Example 1 using the compositions of Examples 2 and 3. The results are listed in Table 2.

Comparative Example 1

A pressure-resistant reactor was charged with 23.3 kg of cyclohexane, 3.75 mmol of TMEDA, and 1.7 kg of styrene I. 125.0 mmol of n-butyllithium was added to the mixture while stirring the mixture at 40° C., and a polymerization reaction was effected at 50° C. for 1 hour. The polymerization conversion ratio of styrene was 100%. 8.4 kg of isoprene I was continuously added to the reactor over 1 hour while maintaining the temperature of the mixture at 50 to 60° C. After the addition, a polymerization reaction was effected for a further 1 hour. The polymerization conversion ratio of isoprene was 100%. After the addition of 27.50 mmol of dimethyldichlorosilane (coupling agent), a coupling reaction was effected for 2 hours. The reaction was terminated by adding 187.5 mmol of methanol (polymerization terminator) to the reactor. The amount of each reagent used for the reaction is listed in Table 1. The reaction mixture was sampled, and various measurements were performed in the same manner as in Example 1. The results are listed in Table 2. 0.3 parts of 2,6-di-tert-butyl-p-cresol (antioxidant) was added to 100 parts (polymer component: 30 parts) of the reaction mixture obtained as described above, and the mixture was mixed. The mixture (mixed solution) was added dropwise in small quantities to heated water (85 to 95° C.) to volatilize the solvent and collect a precipitate. The precipitate was pulverized, and dried with hot air at 85° C. to collect a composition of Comparative Example 1. The tensile properties of the composition were evaluated in the same manner as in Example 1. The evaluation results are listed in Table 2.

Comparative Example 2

A pressure-resistant reactor was charged with 23.3 kg of cyclohexane, 2.50 mmol of TMEDA, and 0.9 kg of styrene I. 83.33 mmol of n-butyllithium was added to the mixture while stirring the mixture at 40° C., and a polymerization reaction was effected at 50° C. for 1 hour. The polymerization conversion ratio of styrene was 100%. 8.2 kg of isoprene I was continuously added to the reactor over 1 hour while controlling the temperature of the mixture at 50 to 60° C. After the addition, a polymerization reaction was effected for a further 1 hour. The polymerization conversion ratio of isoprene was 100%. After the addition of 0.9 kg of styrene II, the mixture was reacted, and the reaction was terminated by adding 125.0 mmol of methanol (polymerization terminator) to the reactor. The amount of each reagent used for the reaction is listed in Table 1. The reaction mixture was sampled, and various measurements were performed in the same manner as in Example 1. The results are listed in Table 2. 0.3 parts of 2,6-di-tert-butyl-p-cresol (antioxidant) was added to 100 parts (polymer component: 30 parts) of the reaction mixture obtained as described above, and the mixture was mixed. The mixture (mixed solution) was added dropwise in small quantities to heated water (85 to 95° C.) to volatilize the solvent and collect a precipitate. The precipitate was pulverized, and dried with hot air at 85° C. to collect a composition of Comparative Example 2. The tensile properties of the composition were evaluated in the same manner as in Example 1. The results are listed in Table 2.

Comparative Example 3-1

A composition of Comparative Example 3-1 was obtained (collected) in the same manner as in Comparative Example 1, except that the amounts of styrene, n-butyllithium, TMEDA, isoprene, dimethyldichlorosilane, and methanol were changed as listed in Table 1. The composition of Comparative Example 3-1 was mixed with the composition of Comparative Example 3-2, and various measurements were performed in the same manner as in Example 1 using the resulting mixture. The results are listed in Table 2.

Comparative Example 3-2

A pressure-resistant reactor was charged with 23.3 kg of cyclohexane and 12.50 mmol of TMEDA. 416.67 mmol of n-butyllithium was added to the mixture while stirring the mixture at 40° C., and 10.0 kg of isoprene I was continuously added to the mixture over 1 hour while maintaining the temperature of the mixture at 50 to 60° C. After the addition, a polymerization reaction was effected for a further 1 hour to form a polyisoprene homopolymer (isoprene homopolymer). The polymerization conversion ratio of isoprene was 100%. The reaction was terminated by adding 625.01 mmol of methanol (polymerization terminator). The amount of each reagent used for the reaction is listed in Table 1. 0.3 parts of 2,6-di-tert-butyl-p-cresol (antioxidant) was added to 100 parts (polymer component: 30 parts) of the reaction mixture obtained as described above, and the mixture was dried at 60° C. under vacuum to collect a composition (polyisoprene) of Comparative Example 3-2. The composition of Comparative Example 3-2 was mixed with the composition of Comparative Example 3-1, and various measurements were performed in the same manner as in Example 1 using the resulting mixture. The results are listed in Table 2. In Table 2, the composition of Comparative Example 3 refers to a composition obtained by mixing the composition (70 parts) of Comparative Example 3-1 and the composition (30 parts) of Comparative Example 3-2.

TABLE 1

|  | Example 1 | Example 2 | Example 3 | Comparative Example 1 | Comparative Example 2 | Comparative Example 3-1 | Comparative Example 3-2 |
| --- | --- | --- | --- | --- | --- | --- | --- |
| Cyclohexane (kg) | 23.3 | 23.3 | 23.3 | 23.3 | 23.3 | 23.3 | 23.3 |
| TMEDA (mmol) | 4.88 | 3.60 | 2.95 | 3.75 | 2.50 | 5.45 | 12.50 |
| n-Butyllithium (mmol) | 162.73 | 120.10 | 98.44 | 125.00 | 83.33 | 181.82 | 416.67 |
| Styrene I (kg) | 2.1 | 1.4 | 1.4 | 1.7 | 0.9 | 2.6 | — |
| Isoprene I (kg) | 7.0 | 4.3 | 4.2 | 8.4 | 8.2 | 7.4 | 10.0 |
| Dimethyldichlorosilane (mmol) | 43.94 | 33.18 | 28.55 | 27.50 | — | 86.36 | — |
| Isoprene II (kg) | 4.0 | 3.3 | 3.4 | — | — | — | — |
| Styrene II (kg) | — | — | — | — | 0.9 | — | — |
| Methanol (mmol) | 244.10 | 180.15 | 147.66 | 187.50 | 125.00 | 272.73 | 625.01 |

TABLE 2

|  |  | Example 1 | Example 2 | Example 3 | Comparative Example 1 | Comparative Example 2 | Comparative Example 3 |
| --- | --- | --- | --- | --- | --- | --- | --- |
| Block copolymer composition | Weight average molecular weight ($\times 10^3$) of entire block copolymer composition | 178 | 157 | 187 | 171 | 162 | 118 |
|  | Weight average molecular weight ($\times 10^3$) of triblock copolymer (A) | 175 | 134 | 152 | 238 | 162 | 156 |
|  | Weight average molecular weight ($\times 10^3$) of diblock copolymer (B) | 190 | 179 | 214 | 115 | 0 | 0 |
|  | Weight average molecular weight ($\times 10^3$) of aromatic vinyl polymer block in triblock copolymer (A) | 15 | 11 | 12 | 13 | 11 | 15 |
|  | $Mw_{Da}/Mw_{Db}$ | 0.8 | 0.7 | 0.6 | 2.1 | — | — |
|  | Content (wt %) of aromatic vinyl monomer unit in entire block copolymer composition | 16.5 | 16 | 15.5 | 16.5 | 18 | 18.5 |
|  | Content (wt %) of aromatic vinyl monomer unit in triblock copolymer (A) | 25 | 25 | 25 | 16.5 | 18 | 26 |
|  | Content (wt %) of aromatic vinyl monomer unit in diblock copolymer (B) | 11.1 | 11.1 | 10.2 | 16.5 | — | — |
|  | $Ar^a/Ar^b$ | 2.3 | 2.3 | 2.5 | 1.0 | — | — |
|  | Content (wt %) of triblock copolymer (A) | 41 | 39 | 38 | 46 | 100 | 70 |

TABLE 2-continued

|  | Example 1 | Example 2 | Example 3 | Comparative Example 1 | Comparative Example 2 | Comparative Example 3 |
|---|---|---|---|---|---|---|
| Content (wt %) of diblock copolymer (B) | 59 | 61 | 62 | 54 | 0 | 0 |
| Content (wt %) of additional component | 0 | 0 | 0 | 0 | 0 | Polyisoprene (Mw: 40,000) 30% |
| Tensile properties | | | | | | |
| Breaking strength (MPa) | 2.0 | 2.8 | 2.1 | 8.6 | 37.1 | 2.5 |
| Elongation at break (%) | 1,050 | 750 | 750 | 1,300 | 1,300 | 750 |

$Mw_{Da}$: Weight average molecular weight of polyisoprene block in triblock copoymer (A)
$Mw_{Db}$: Weight average molecular weight of polyisoprene block in diblock copolymer (B)
$Ar^a$: Content of aromatic vinyl monomer unit in triblock copolymer (A)
$Ar^b$: Content of aromatic vinyl monomer unit in diblock copolymer (B)

Example 4

The composition (100 parts) obtained in Example 1 was put in a stirring blade-type mixer. After the addition of 150 parts of a tackifying resin ("Quintone (registered trademark) D100" manufactured by Zeon Corporation, aliphatic-aromatic copolymerization-type hydrocarbon resin), 50 parts of a softener ("SUNPURE N90" manufactured by Nihonkosan Co., Ltd., naphthenic process oil), and 3 parts of an antioxidant ("Irganox (registered trademark) 1010" manufactured by BASF), the atmosphere inside the system was replaced by nitrogen gas, and the mixture was mixed (kneaded) at 160 to 180° C. for 1 hour to prepare a label-forming pressure-sensitive adhesive composition of Example 4. The resulting label-forming pressure-sensitive adhesive composition was applied to a polyester film having a thickness of 25 μm to prepare a sample, and the initial adhesion and the holding power were evaluated using the sample. The results are listed in Table 3.

Examples 5 and 6 and Comparative Examples 4 to 6

Label-forming pressure-sensitive adhesive compositions of Examples 5 and 6 and Comparative Examples 4 to 6 were prepared in the same manner as in Example 4, except that the compositions obtained in Examples 2 and 3 and Comparative Examples 1 to 3 were respectively used. The resulting label-forming pressure-sensitive adhesive compositions were evaluated in the same manner as in Example 4. The results are listed in Table 3.

TABLE 3

|  | Example 4 | Example 5 | Example 6 | Comparative Example 4 | Comparative Example 5 | Comparative Example 6 |
|---|---|---|---|---|---|---|
| Loop tack (N/25 mm) (1,000 mm/min, HDPE, 23° C.) | 4.4 | 4.5 | 5.0 | 4.5 | 3.0 | 4.1 |
| Holding power (min) (SUS, 50° C., 10 mm × 25 mm) | 85 | 46 | 42 | 60 | 120 | 10 |

The following were confirmed from results listed in Tables 2 and 3. Specifically, the label-forming pressure-sensitive adhesive compositions according to the invention including the block copolymer composition according to the invention exhibiting low breaking strength and low elongation at break as the main component, exhibited excellent holding power, excellent pressure-sensitive adhesive performance, and an excellent die-cutting capability (Examples 4 to 6). On the other hand, the label-forming pressure-sensitive adhesive compositions that did not include the block copolymer composition according to the invention exhibited an unsatisfactory balance with regard to the above properties (Comparative Examples 4 to 6).

INDUSTRIAL APPLICABILITY

The embodiments of the invention thus provide a pressure-sensitive adhesive composition that exhibits excellent initial adhesion at a low temperature and excellent holding power at a high temperature, and exhibits excellent pressure-sensitive adhesive performance and an excellent die-cutting capability when used for a pressure-sensitive adhesive label, and a block copolymer composition that is used to produce the pressure-sensitive adhesive composition.

Since the pressure-sensitive adhesive composition exhibits excellent pressure-sensitive adhesive performance over a wide temperature range, the pressure-sensitive adhesive composition can be used for various pressure-sensitive adhesive tapes, pressure-sensitive adhesive sheets, pressure-sensitive adhesive labels, dirt-removing roller, and the like that are used in the fields of packages, office supplies, double-sided tapes, masking, electrical insulation, and the like. In particular, since the pressure-sensitive adhesive composition exhibits an excellent die-cutting capability, the pressure-sensitive adhesive composition can suitably be used for a pressure-sensitive adhesive label.

The invention claimed is:

1. A block copolymer composition comprising an aromatic vinyl-isoprene-aromatic vinyl triblock copolymer (A) and an aromatic vinyl-isoprene diblock copolymer (B), wherein (i) a ratio ($Mw_{Da}/Mw_{Db}$) of a weight average molecular weight $Mw_{Da}$ of a polyisoprene block in the triblock copolymer (A) to a weight average molecular weight $Mw_{Db}$ of a polyisoprene block in the diblock copolymer (B) is 0.5 or more to less than 1, (ii) a ratio of an aromatic vinyl monomer unit in all polymer components of the block copolymer composition is 10 to 30 mass %, (iii) a ratio ($Ar^a/Ar^b$) of an aromatic vinyl monomer unit content $Ar^a$ in the triblock copolymer (A) to an aromatic vinyl monomer unit content $Ar^b$ in the diblock copolymer (B) is 2.3 or more, and (iv) the block copolymer composition has a breaking strength of less than 8 MPa and an elongation at break of less than 1,100% as measured according to JIS K 6251 using a sheet of the block copolymer composition that is press-formed at 170° C. to have a thickness of 1 mm and a dumbbell shape in conformity with JIS-7113-2 (size: ½).

2. The block copolymer composition according to claim 1, wherein the triblock copolymer (A) has a weight average molecular weight of 100,000 to 250,000, and the diblock copolymer (B) has a weight average molecular weight of 100,000 to 300,000.

3. The block copolymer composition according to claim 1, comprising the triblock copolymer (A) and the diblock copolymer (B) in a ratio of 20 to 80 mass %, respectively.

4. A pressure-sensitive adhesive composition comprising the block copolymer composition according to claim 1, and a tackifying resin.

5. The pressure-sensitive adhesive composition according to claim 4, being used for a pressure-sensitive adhesive label.

6. A pressure-sensitive adhesive sheet comprising a pressure-sensitive adhesive layer that comprises the pressure-sensitive adhesive composition according to claim 4.

* * * * *